F. BRADSHAW.
Stalk-Chopper.
No. 7,078. Patented Feb. 12. 1850.
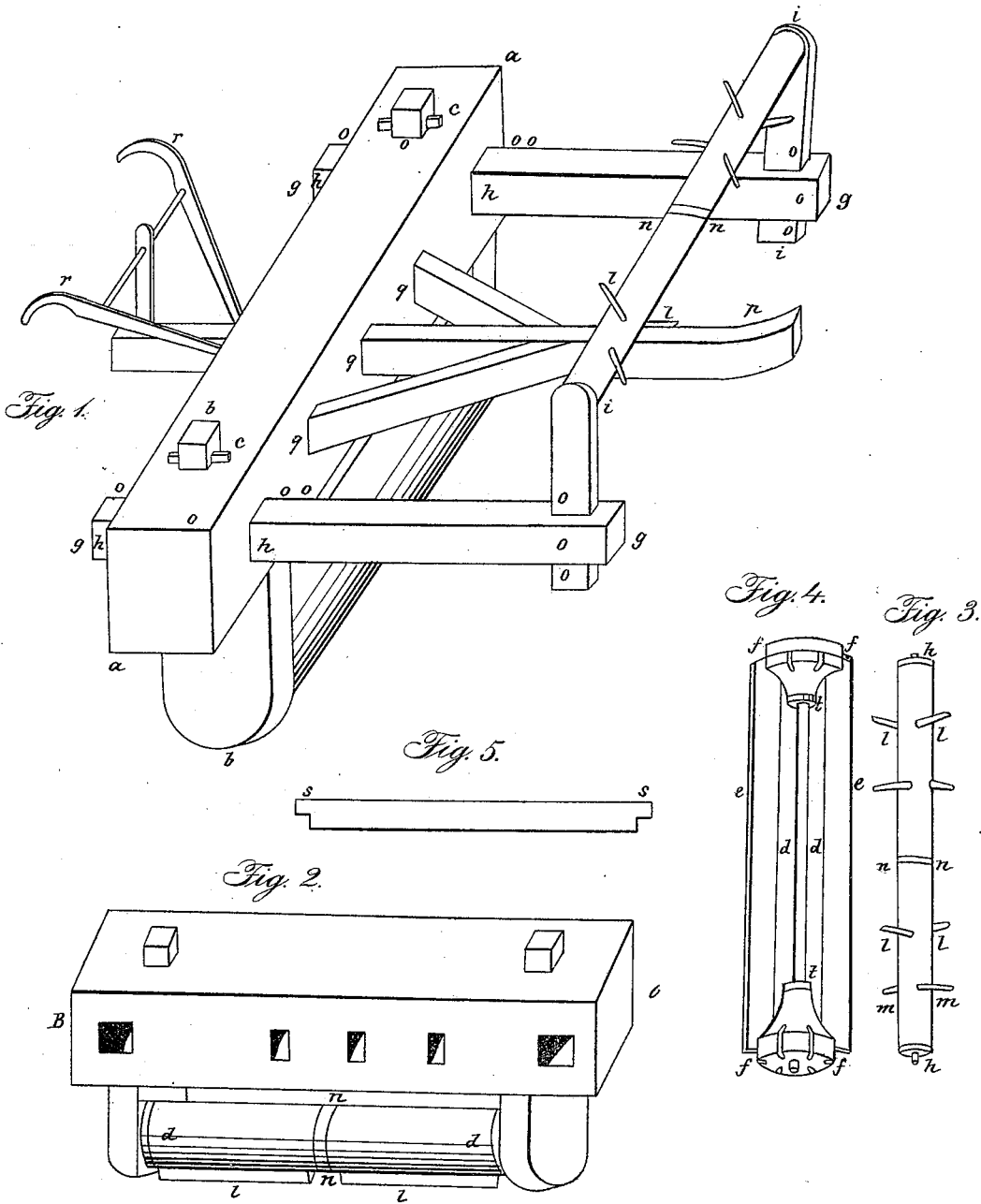

UNITED STATES PATENT OFFICE.

FIELDS BRADSHAW, OF CLINTON, ALABAMA.

MACHINE FOR CUTTING COTTON-STALKS IN THE FIELD.

Specification forming part of Letters Patent No. 7,078, dated February 12, 1850.

*To all whom it may concern:*

Be it known that I, FIELDS BRADSHAW, of Clinton, in the county of Greene and State of Alabama, have invented a new and useful machine for cutting down and cutting into pieces cotton-stalks, which machine I have named and styled the "Cotton-Stalk Cutter"; and I do hereby declare that the following is a full, clear, and exact description of the construction and operation of the same, reference being had to the annexed drawings, making a part of this specification, in which—

Figure 1 is a descriptive view, in which all the principal parts of the machine appear in connection. Fig. 2 shows the connection of the large beam and the main roller. In Fig. 3 is seen the small front roller with knives upon it, and a band around the middle thereof. Fig. 4 is the large main roller with the knives or cutters upon it, which are the chief instruments in cutting down and cutting to pieces the cotton-stalks.

In Fig. 1, $a\ a$ is a solid beam of timber eight feet in length, twelve inches wide, and ten inches in depth. This beam gives support to every other part of the machine, and is the means of increasing or diminishing the weight thereof. Instead of this solid beam, two smaller beams may be used, united by cross-beams, in which the main roller may turn with or without additional braces. The braces marked $b\ b$ are mortised perpendicularly through the large beam, near each end thereof, and fastened above by wedges marked $c\ c$. Immediately underneath the beam are shoulders on the braces, giving strength to the tenons. These braces extend eight or nine inches below the beam, and in the inner sides fixed washers of iron are sunk, in which are holes to receive the gudgeons that are on the ends of the larger roller. In Fig. 2 will be seen how this roller (marked $d\ d$) turns between the braces just described. This roller is six feet in length and seven inches in diameter.

The iron and steel cutters inserted on the roller are marked $e\ e$, Figs. 4 or 2, being twenty-six inches in length and two inches and a half wide, sinking half an inch into the cylinder for their better support. These are eight in number on each end of the roller; but a less or greater number may be used successfully. As a general rule there should be one cutter to each inch of the roller's diameter. These knives are the chief instruments in cutting down and cutting to pieces the cotton-stalks and limbs, turning immediately on them when the machine moves forward, first cutting them off near or at the ground, then running over them, cutting them into small pieces. These cutters are made of iron or steel, or iron with steel edges, the edges being sharp for the purpose of cutting the stalks. By its connection with the large beam the main roller is small, and yet attended with sufficient weight. Hence fewer cutters are necessary, thus making a saving of iron and steel, and making the machine more efficient, as by the rapidity of the roller's motion the cutters strike the cotton-stalks with more force.

In Fig. 4, $f\ f$ are iron bands on the ends of the cutters to keep them in their places, the ends thereof being flattened and made level with the surface of the roller for this purpose.

The knives may be moved nearer to or farther from the center or middle of the cylinder by the removal of these bands, thus accommodating the machine to wide or narrow rows of cotton.

Fig. 1, $g\ g$ are transverse beams mortised through the main beam at $h\ h$. On these are raised the upright beams $i\ i$, Fig. 1. In these the small front roller turns by gudgeons marked $k\ k$ in Fig. 3. The object of this roller is first to bend the stalks forward before the cutters on the large roller strike them, and for employing, when necessary, the knives which are placed on it (marked $l\ l$, see Fig. 1 of the new drawings) for the purpose of cutting off the ends of the large limbs of the cotton-stalks. The number of these cutters may be increased and placed on any part of the roller, as circumstances may require. A convenient method will be to insert them in cylinders or bands of iron, as seen at $m\ m$, Fig. 3, which, being fitted to the roller, may be moved to any point and fastened with screws. For this purpose the front roller may be made with six or eight equal sides. As a general rule there should be one of these knives on each side of each row of cotton-stalks. When these knives, which are made of iron or steel, are used, the small roller should be turned by the band $n\ n$, Figs. 2, 3, and 1 of the drawings, which, going round the middle of the large and small rollers, will turn the latter with a rapidity proportioned to the difference of the circumference of the rollers where the band goes around them. For this purpose, if necessary, the middle of the large cylinder may be elevated, or the middle of the small one lessened. In small cotton-stalks the front roller may be dispensed with, and when it is used only for the purpose of pushing the stalks forward the knives connected with it may be dispensed with. The small roller, just described, is three inches in diameter and six and a half feet long. Its distance in advance may be eighteen inches and its height from the ground three feet; but in the transverse and upright beam marked $g$ $g$ and $i\,i$ holes are made (see $o\,o$, Fig. 1) for the purpose of raising or lowering and moving it backward or forward, as circumstances may require. The tongue of this machine is seen at $p$, Fig. 1, the two arms thereof being mortised through the large beam at $g\,g$, and fastened behind by pins.

$r\,r$ are the handles, that assist in turning and guiding the machine. They should be dovetailed or mortised in the large beam, and may or may not extend to the arms of the tongue, as seen in the drawings. They should be fastened by pins or screws, that they may be taken off at pleasure. In the construction of this machine every part may be made larger or smaller in proportion to the width of the rows and the size of the cotton-stalks where it is to be used. It is constructed to cut two rows at the same time, as will be seen by the construction of the roller and cutters. It may, however, be adapted to the cutting of one row instead of two, and this may be expedient where the stalks are unusually large. In this case one set of cutters, instead of two, will be employed, and the tongue constructed for oxen, as perhaps the best method of drawing this single machine. In other respects the construction will be the same as in the double machine. The oxen will walk one on one side and the other on the other side of the row to be cut down.

The double machine is conveniently drawn by one or two mules or horses.

What I claim as my invention, and desire to secure by Letters Patent, is—

The adaptation of iron and steel knives or cutters to the cutting down and cutting to pieces of cotton-stalks, either in a green or dry state, in the manner and for the purpose above described.

FIELDS BRADSHAW.

Attest:
 S. F. HALE,
 S. I. CHAPMAN.